(12) United States Patent
Konagaya

(10) Patent No.: US 7,230,672 B2
(45) Date of Patent: Jun. 12, 2007

(54) IMAGE RECORDING APPARATUS AND IMAGE RECORDING METHOD

(75) Inventor: Tatsuya Konagaya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 210 days.

(21) Appl. No.: 10/989,251

(22) Filed: Nov. 17, 2004

(65) Prior Publication Data

US 2005/0105065 A1    May 19, 2005

(30) Foreign Application Priority Data

Nov. 18, 2003    (JP) .............................. 2003-387502

(51) Int. Cl.
G03B 27/52 (2006.01)
G03B 29/00 (2006.01)

(52) U.S. Cl. .......................... 355/29; 396/612; 355/27; 355/40

(58) Field of Classification Search .................. 355/27, 355/29, 40, 41; 396/612
See application file for complete search history.

(56) References Cited

U.S. PATENT DOCUMENTS 5,929,975 A * 7/1999 Matsumoto .................. 355/46

FOREIGN PATENT DOCUMENTS

JP    2001-83609 A    3/2001

* cited by examiner

Primary Examiner—D. Rutledge
(74) Attorney, Agent, or Firm—Sughrue Mion, PLLC

(57) ABSTRACT

A movable guide is switchable between a guide position for regulating a flexure of a cut paper, and a release position for allowing the flexure of the cut paper. The movable guide is disposed between an exposure feed-roller pair and a guiding/carrying roller pair, which is switchable between a nip state for nipping the cut paper and a release state for releasing the nip thereof. When an anterior end of the cut paper reaches the guiding/carrying roller pair during image recording, this roller pair is changed from the release state to the nip state. A speed of the cut paper carried by the guiding/carrying roller pair is reduced. After that, rotation of the guiding/carrying roller pair is accelerated to carry the cut paper.

17 Claims, 8 Drawing Sheets

IMAGE RECORDING APPARATUS AND IMAGE RECORDING METHOD

BACKGROUND OF THE INVENTION

1. Field of the Invention

The present invention relates to an image recording apparatus including a recording section and a recorded-paper carrying section, wherein the recording section records an image on a cut recording-paper having a predetermined length in accordance with a record size, and the recorded-paper carrying section carries the cut recording-paper, on which the image has been recorded, to a post-process. The present invention further relates to an image recording method.

2. Description of the Related Art

A printer processor for producing a photo print is widely used. In this kind of the printer processor, a photosensitive recording paper is exposed to form an image with recording light whose intensity is modulated on the basis of digital image data, which is obtained by photoelectrically reading the image recorded on a photographic film. The image data is sometimes recorded in a storage medium of a memory card and so forth. The exposed recording paper is developed and dried to produce the photo print. This kind of the printer processor has an advantage that image quality is improved by executing image processing of color-balance correction, sharpness correction and so forth.

In the printer processor of a digital exposure system, the image is exposure-recorded one line by one line as a cut recording-paper is accurately advanced by a feeding roller pair of an exposure feed section. After the exposure recording, the cut recording-paper is forwarded from the exposure feed section to a post-exposure carry section, and then is sent to a processor by a carrying roller pair constituting the post-exposure carry section. In the processor, a developing/fixing process is executed as a post-process. When the cut recording-paper to be carried is long, an anterior end thereof sometimes enters the post-exposure carry section during the exposure recording. At this time, a shock is caused when the cut recording-paper is nipped by the carrying roller of the post-exposure carry section. Upon reception of the shock, a feed speed of the cut recording-paper fluctuates during the exposure so that exposure unevenness is likely to occur.

In view of this, Japanese Patent Laid-Open Publication No. 2001-83609 discloses an image recording apparatus in which a cut recording-paper is nipped and carried only by a downstream roller pair included in a plurality of roller pairs constituting a post-exposure carry section. Further, a carry guide provided in the post-exposure carry section is opened to allow a flexure of the cut recording-paper. In this way, since the cut recording-paper is nipped and carried by the minimum carrying roller pair, it is possible to reduce a shock to be received by the cut recording-paper.

In the image recording apparatus according to the above-noted Publication No. 2001-83609, a carry speed of the cut recording-paper carried by the post-exposure carry section is adapted to be slower that a feed speed (in other words, an exposure speed) of the exposure feed section to form the flexure. In a processor for executing a developing/fixing process as a post-process, a carry speed of the cut recording-paper is limited to the carry speed of the post-exposure carry section. Thus, it is necessary to design the carry speed in the processor so as to be slower than the exposure speed. Especially, in a case that image recording is simultaneously performed for the cut recording-papers arranged in plural rows, although the exposure speed may be set so as to be slow in comparison with the case of a single-row processing, it is necessary to design the carry speed so as to be slow as well. As just described, when the flexure is formed in order to reduce the shock to be applied to the cut recording-paper, the carry speed (post-processing speed) of the processor for executing the post-processing is limited. Thus, there is a problem in that the cost required for the design increases.

SUMMARY OF THE INVENTION

In view of the foregoing, it is a primary object of the present invention to provide an image recording apparatus and an image recording method in which a shock to be applied to a cut recording material during image recording is reduced.

It is a second object of the present invention to provide an image recording apparatus and an image recording method in which it is possible to freely design a record speed and a post-processing speed.

In order to achieve the above and other objects, the image recording apparatus according to the present invention comprises a recorder, a feeder, a carrying roller pair and a regulation member. The recorder records an image on the cut recording material severed in accordance with a print size. The feeder feeds the cut recording material along a passage such that the cut recording material passes the recorder. The carrying roller pair is disposed at a downstream side of the feeder to carry the cut recording material from the feeder to a post-processing section.

The regulation member is disposed between the feeder and the carrying roller pair. The regulation member is switchable between a first state for regulating a flexure of the cut recording material, and a second state for allowing the flexure thereof. The carrying roller pair is switchable between a nip state for nipping the cut recording material, and a release state for releasing the nip of the cut recording material.

When an anterior end of the cut recording material reaches the carrying roller pair during image recording, the regulation member is switched to the second state and the carrying roller pair is switched from the release state to the nip state. After that, a speed of the cut recording material carried by the roller pair is reduced from a first speed. And then, rotation of the roller pair is accelerated to carry the cut recording material at a second speed.

It is preferable that the carting roller pair is temporarily stopped before accelerating the rotation thereof. Moreover, it is preferable that a feed speed of the feeder is defined as the first speed. As to the second speed, it is preferable to be substantially same with or faster than the feed speed of the feeder. Alternatively, the second speed may be same with a speed of the cut recording material to be carried in the post-processing section.

It is preferable that the feeder is connected to a motor via a traction drive unit. Further, it is preferable that the regulation member is provided with a guide of the cut recording material to conduct the cut recording material in the first state. The guide releases the cut recording material in the second state.

The image recording method according to the present invention includes the steps of switching the regulation member from the first state to the second state to allow the flexure of the cut recording material, and switching the carrying roller pair from the nip releasing state to the nip state virtually simultaneously same with the switch of the regulation member.

According to the present invention, the shock to be applied to the cut recording material during the image recording may be kept at low level, and it is possible to freely design both of the feed speed to be set for recording an image and the carry speed to be set for post-processing. Further, it is possible to prevent the feed speed of the cut recording material from changing due to load fluctuation caused at the time of forming the flexure of the cut recording material, since the feeding section is connected to the motor via the traction drive unit.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
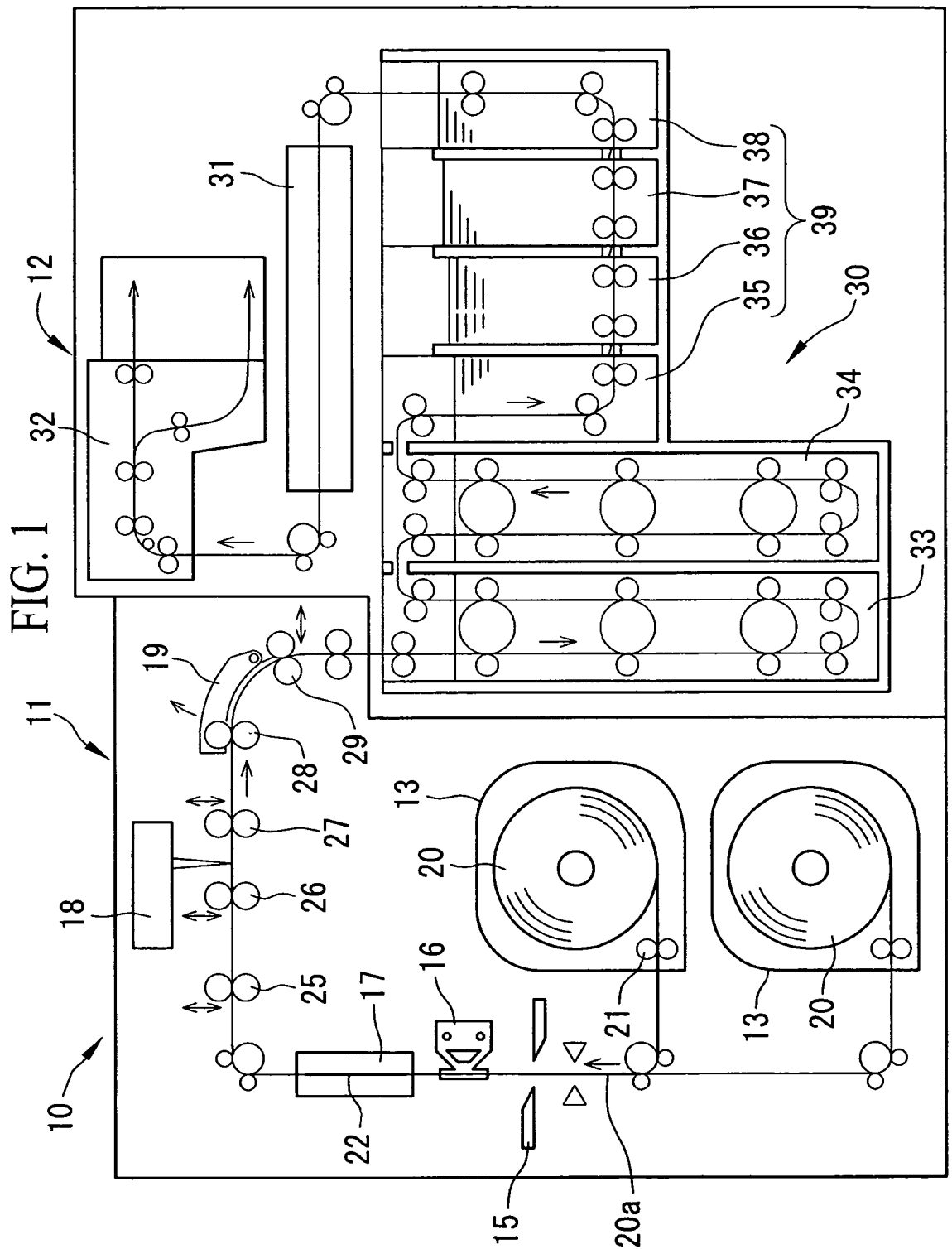
FIG. 1 is an explanatory illustration schematically showing a structure of a printer processor.

FIG. 1 schematically shows a structure of a printer processor according to the present invention. The printer processor 10 comprises a printer section 11 and a processor section 12. The printer section 11 includes recording-paper magazines 13, a cutter 15, a back-printing unit 16, a sorter 17, an exposure unit 18, a movable guide 19 and so forth.

The recording-paper magazines 13 are vertically arranged in the drawing, and respectively contain a recording-paper roll 20 formed by rolling a recording paper 20a having photosensitivity. A paper roller pair 21 in the recording-paper magazine 13 is rotated by a motor, which is not shown. Upon rotation of the paper roller pair 21, the recording paper 20a is drawn from the recording-paper roll 20 to the outside of the recording-paper magazine 13. The cutter 15 cuts the recording paper 20a in a length determined in accordance with a print size to form a cut recording-paper (hereinafter, simply called as a cut paper) 22.

Figure 2:
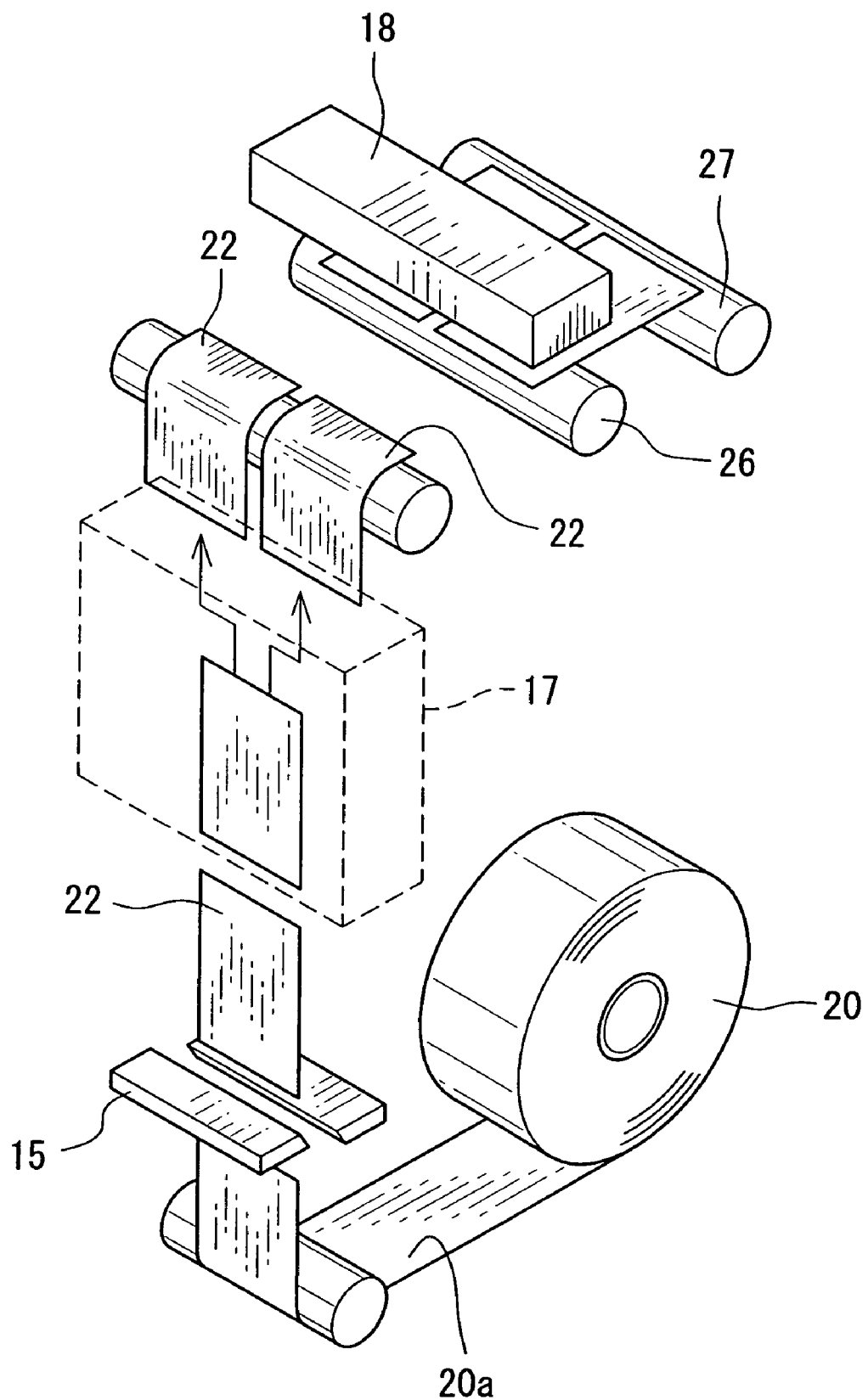
FIG. 2 is a perspective view partially showing a structure of a printer section.

As shown in FIG. 2, the cut paper 22 is severed by the cutter 15 so as to have the predetermined length. The back-printing unit 16 prints necessary information, which concerns a frame number, correction data and so forth, on a rear surface of the cut paper 22. And then, the sorter 17 shifts the cut paper 22 in a width direction thereof to arrange the cut papers 22 in plural rows. Incidentally, the cut papers 22 are arranged in tow rows in FIG. 2, but may be arranged in three or more rows. When a width of the cut paper 22 is wide, the cut papers may be carried in a single row without sorting them. A structure of the sorter is not especially limited. Various kinds of sorters may be applicable. For example, it is possible to adopt a sorter using a nip roller being movable in a rotational-axis direction (see Japanese Patent Laid Open Publication No. 9-329885). It is also possible to adopt a sorter using a D-roller rotating in a width direction (see Japanese Patent Laid-Open Publication No. 10-268437). Moreover, it is possible to adopt a sorter in which a cut paper placed on a belt conveyor is picked up with suckers (see Japanese Patent Laid-Open Publication No. 11-38588).

A registration roller pair 25 is disposed between the sorter 17 and the exposure unit 18 to correct a skew of the cut paper 22. A method for correcting the skew is not especially limited. For example, it is possible to adopt methods of so-called top registration and side registration. In the top registration, an anterior end of the cut paper 22 abuts on the registration roller pair 25 of a nip state and the skew is corrected by forming flexure on the cut paper 22. In the side registration, the skew is corrected by rotating the registration roller pair 25 on a plane of the cut paper 22.

In FIG. 1, the exposure unit 18 has a built-in laser printer, which is well known, to record a latent image on the cut paper 22 by radiating recording light in a width direction (scanning direction) of the cut paper 22 on the basis of image data recorded in a storage medium of a memory card and so forth. The image data may be obtained by a film scanner being as an image reading device. First and second exposure feed-roller pairs 26 and 27 constituting an exposure feed section are changeable between a nip state and a release state. In the nip state, the cut paper 22 is nipped and fed toward a downstream side (in a sub-scanning direction). In the release state, the nip of the cut paper 22 is released. The first and second exposure feed-roller pairs 26 and 27 are respectively set in the nip state after the anterior end of the cut paper has passed. The exposure feed-roller pairs 26 and 27 are respectively switched to the release state before a posterior end of the cut paper 22 passes. Owing to this, a feed speed of the cut paper 22 is prevented from fluctuating during the exposure recording.

The cut paper 22 on which an image has been recorded is nipped by an intermediate carrying roller pair 28 and a guiding/carrying roller pair 29. The cut paper is carried along the movable guide 19 and is forwarded to the processor section 12 after turning by about 90 degrees. As described later in detail, when a length of the cut paper 22 is longer than a predetermined length (160 mm, for instance) in a feed direction of the cut paper 22, the movable guide 19 is rotated in a clockwise direction in the drawing to allow the flexure of the cut paper 22.

The cut paper 22 having passed the movable guide 19 is nipped by the guiding/carrying roller pair 29 and is carried to the processor section 12 constituted of a developing unit 30, a drying unit 31 and a sheet discharging unit 32. The developing unit 30 comprises a development bath 33, a bleach/fixation bath 34 and a wash bath 39 including a first wash bath 35, a second wash bath 36, a third wash bath 37 and a fourth wash bath 38, which are disposed in this order from an upstream side in the feed direction of the cut paper 22 (from a left side in the drawing). The development bath 33 and the bleach/fixation bath 34 respectively store a developing solution and a bleaching/fixing solution by a predetermined amount. Further, the first to fourth wash bathes 35 to 38 respectively store washing water by a predetermined amount. Processes of development, fixation and washing are executed while the cut paper 22 is carried in the respective bathes 33 to 38 by receiving drive forces of carry racks respectively provided in the development bath 33, the bleach/fixation bath 34 and the first to fourth wash bathes 35 to 38.

The drying unit 31 is disposed above the respective bathes 33 to 38 and is constituted of a conveyor belt and a fan duct. Dried air heated by a heater is jetted out of the fan duct toward the conveyor belt to press the cut paper 22 against the conveyor belt. In this state, the cut paper 22 passes the fan duct so that washing water on the cut paper 22 is removed. The cut paper 22 having passed the drying unit 31 is forwarded to the sheet discharging unit 32 wherein the cut papers 22 are sorted in accordance with print sizes and print jobs, and are discharged onto trays (not shown) provided in the processor section 12.

Figure 3:
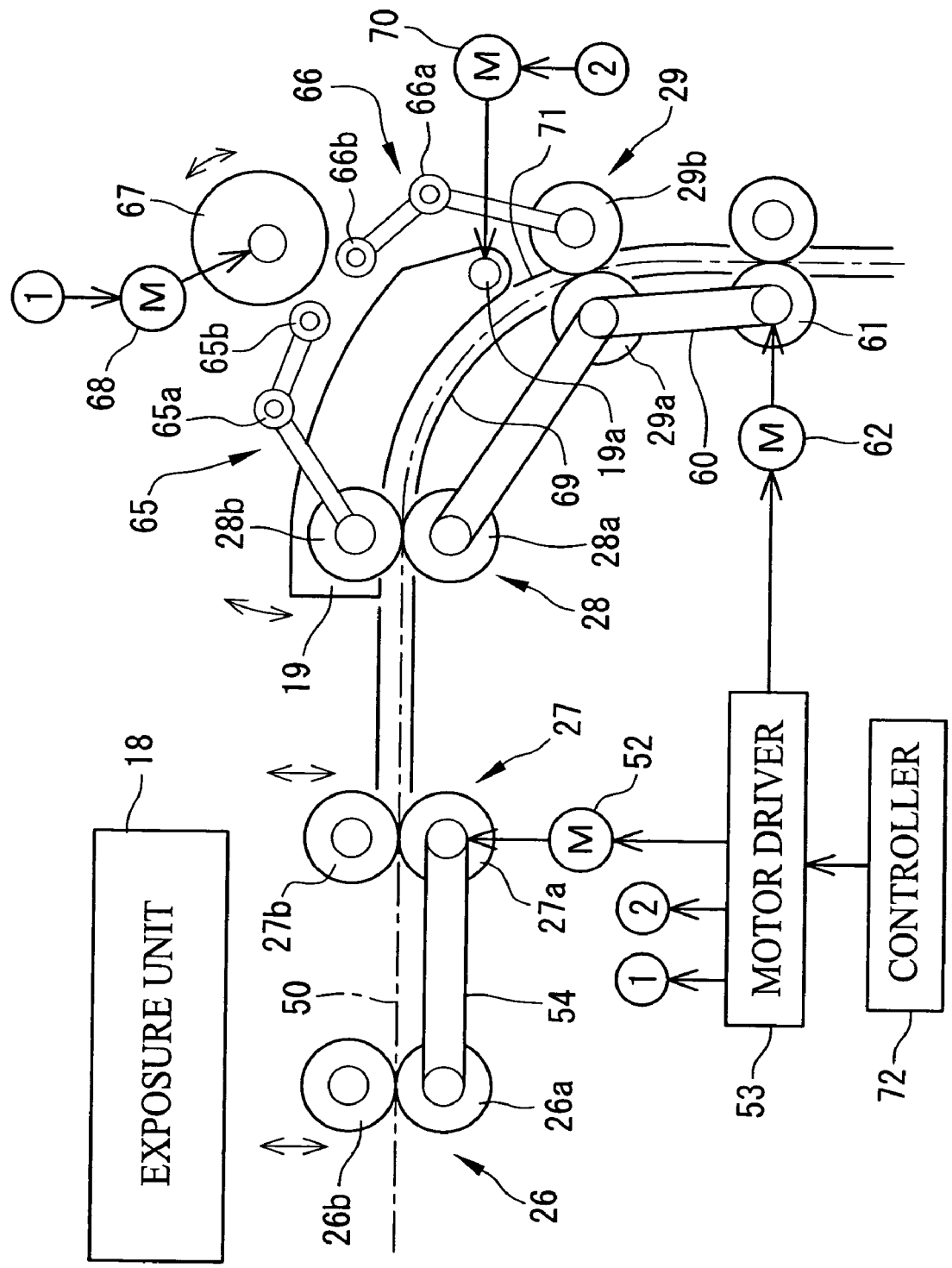
FIG. 3 is a side view schematically showing a feeding mechanism of a cut recording-paper.

FIG. 3 shows an example of the mechanism for carrying the cut paper 22 from the exposure unit 18 to the processor section 12. The first and second exposure feed-roller pairs 26 and 27 respectively comprise drive rollers 26a and 27a driven by a motor, and nip rollers 26b and 27b movable in a vertical direction in the drawing. The nip rollers 26b and 27b are respectively switchable between a nip position for nipping and feeding the cut paper 22 by entering a passage 50 of the cut paper 22, which is shown by a dashed line in the drawing, and an evacuation position for evacuating from the passage 50. The nip rollers 26b and 27b are moved to the nip positions after the anterior end of the cut paper 22 has passed, and are switched to the evacuation positions before the posterior end of the cut paper 22 passes. Mechanisms for moving the nip rollers 26b and 27b are not especially limited. It is possible to adopt a proper mechanism in accordance with a specification of the apparatus. For example, a mechanism combining a cam and a link may be adopted. Alternatively, a mechanism using a solenoid may be adopted.

Figure 4:
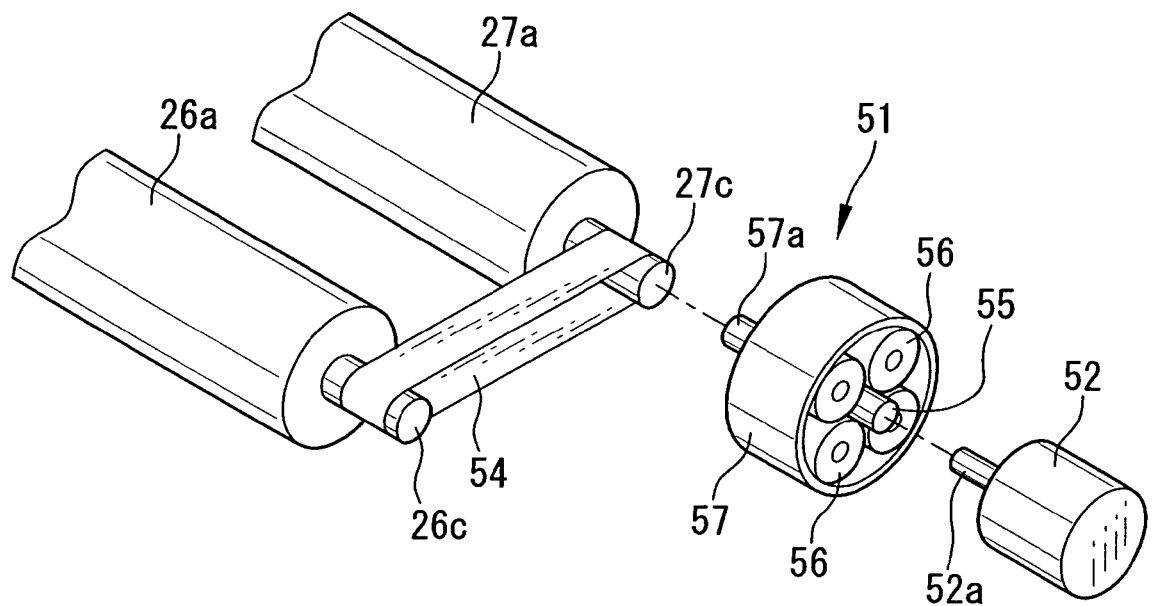
FIG. 4 is a perspective view showing a drive transmitting mechanism using a traction drive unit.

The drive roller 27a of the second exposure feed-roller pair 27 is connected to a motor 52, which is used for exposing and feeding, via a traction dive unit 51 (see FIG. 4). The motor 52 is driven upon receiving drive pulses from a motor driver 53. When the motor 52 is driven, the drive roller 27a is rotated to feed the cut paper 22 with the nip roller 27b kept in the nip position. As shown in FIG. 4, rotational shafts 26c and 27c of the drive rollers 26a and 27b are connected to each other via a timing belt 54. Consequently, the drive rollers 26a and 27a are rotated by the drive of the motor 52 at an identical speed.

As shown in FIG. 4, the traction drive unit 51 comprises a sun shaft 55 joined to an output shaft 52a of the motor 52, planetary rollers 56 abutting on the sun shaft 55 via an oil film (traction oil), and a fixed drum 57 for holding the sun shaft 55 and the planetary rollers 56. When the motor 52 is driven to rotate the sun shaft 55, a drive force is transmitted to the planetary rollers 56 via the oil film and the planetary rollers 56 are revolved along an inner surface of the fixed drum 57. Further, the drive force of the motor 52 is transmitted to the drive roller 27a via an output shaft 57a joined to the rotary shaft of the planetary rollers 56. The reduction mechanism using the traction drive unit 51 has higher rigidity in comparison with another reduction mechanism using a timing belt. Thus, there is an advantage for load fluctuation. Incidentally, a reduction ratio may be increased by connecting the traction drive units 51 in series.

In FIG. 3, the intermediate carrying roller pair 28 and the guiding/carrying roller pair 29 are respectively constituted of drive rollers 28a and 29a driven by a motor, and nip rollers 28b and 29b movable between a nip position for nipping and carrying the cut paper 22 and an evacuation position for evacuating from the passage 50 of the cut paper 22. The drive rollers 28a and 29a are connected, via a timing belt 60, with a carrying roller pair 61 disposed at a downstream side. Thus, when a motor 62 connected to the carrying roller pair 61 is driven, the drive rollers 28a and 29a are rotated at an identical speed. A speed of the cut paper 22 to be carried by the drive rollers 28a and 29a may be easily altered by changing an amount of current flowing into the motor 62. In another way, this speed may be easily altered by changing a drive pulse rate.

The respective nip rollers 28b and 29b are attached to ends of link mechanisms 65 and 66 rotatably disposed around rotary shafts 65a and 66a. The other ends of the link mechanisms 65 and 66 are provided with rollers 65b and 66b disposed near an eccentric cam 67. Incidentally, the link mechanisms 65, 66 or the nip rollers 28b, 29b are urged by springs so that the nip rollers 28b, 29b are respectively retained at the nip positions in an initial state of the apparatus.

The eccentric cam 67 is rotated by receiving a drive force from a nip controlling motor 68. Upon rotation of the eccentric cam 67, the rollers 65b and 66b of the link mechanisms 65 and 66 are pressed in order by a peripheral surface of the eccentric cam 67. Owing to this, the link mechanisms 65 and 66 are respectively rotated to move the nip rollers 28b and 29b from the nip position toward the evacuation position. Upon further rotation of the eccentric cam 67, the peripheral surface of the eccentric cam 67 separates from the rollers 65b and 66b of the link mechanisms 65 and 66. Thus, the nip rollers 28b and 29b are returned from the evacuation position to the nip position by the spring. In this way, the positions of the nip rollers 28b and 29b are controlled in accordance with the rotational position of the eccentric cam 67.

The movable guide 19 is disposed between the intermediate carrying roller pair 28 and the guiding/carrying roller pair 29 to constitute an outer curving guide, which is for guiding the cut paper 22 with a fixed inner curving guide 69. The cut paper 22 forwarded from the second exposure feed-roller pair 27 is carried along the passage 50 formed between the inner curving guide 69 and the movable guide 19. During this time, an advancement direction of the cut paper 22 is turned by about 90 degrees, and then, the cut paper 22 is forwarded toward the processor section 12.

The movable guide 19 is rotatable around a rotary shaft 19a provided at aside of the guiding/carrying roller pair 29. Upon driving a guide releasing motor 70 connected to the rotary shaft 19a via a gear train, which is not shown, the movable guide 19 is rotated in a clockwise direction from a guide position for guiding the cut paper 22 (see FIG. 7A). The movable guide 19 is moved to a release position for releasing the guide of the cut paper 22 (see FIG. 7B). In this release position, the cut paper 22 passing the inner curving guide 69 is capable of forming a flexure outwardly. In other words, the movable guide 19 works as a regulation member for regulating the flexure of the cut paper 22 in a guide state and allowing the flexure thereof in a release state. The movable guide 19 is moved only when the long cut paper 22 is carried, or only when the anterior end of the currently-exposed cut paper 22 passes an outer fixed guide 71 disposed between the movable guide 19 and the guiding/carrying roller pair 29. Meanwhile, when the cut paper 22 is short, the movable guide 19 is not moved.

The above-mentioned motors 52, 62, 68 and 70 are respectively controlled by a controller 72 via the motor driver 53. Nipping and carrying the cut paper 22 and moving the movable guide 19 are performed by driving the corresponding motors in accordance with the length of the cut paper 22 and the position thereof.

The mechanism for moving the nip rollers 28b and 29b is not limited to the above structure. The respective nip rollers 28b and 29b may be individually movable and may be moved by using a solenoid. Further, the nip roller 28b may be associated with the movable guide 19 by interlocking them.

An operation of the printer processor having the above structure is described below, referring to the drawings. Upon instruction of image recording by an operator, the strip-shaped recording paper 20a is drawn out of the recording-paper magazine 13 and is cut into the cut paper 22 by actuating the cutter 15 so as to have a size corresponding to a print size. The cut papers 22 are sorted into two rows in the sorter 17 after recording the predetermined print information in the back-printing unit 16. The skew of the cut paper 22 sorted into two rows is corrected by the registration roller pair 25, and then, the cut paper 22 is sent toward the exposure unit 18.

The exposure unit 18 records a latent image by radiating the recording light to the cut paper 22, which is nipped by and carried between the first and second feed-roller pairs 26 and 27. The cut paper 22 on which the image has been recorded is carried to the downstream side by the guiding/carrying roller pair 29, being guided by the movable guide 19, so that the cut paper 22 is forwarded to the processor section 12. In the processor section 12, the respective processes of developing, fixing and drying are executed for the exposed cut paper 22 to output the photo print.

Figure 5A:
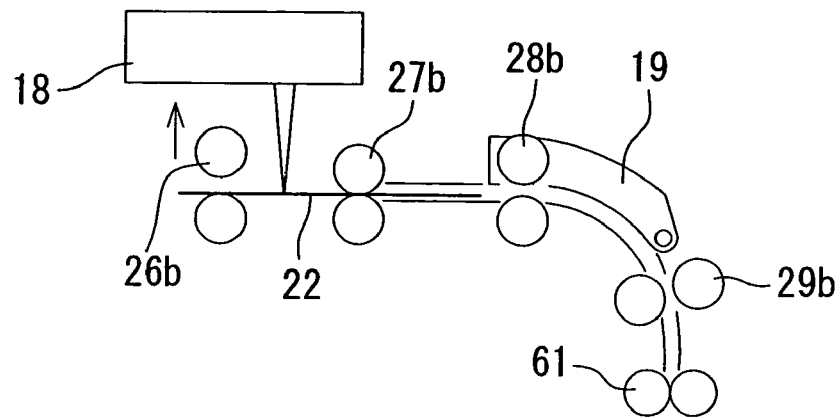
FIGS. 5A, 5B and 5C are explanatory illustrations showing an operation of the feeding mechanism in a case that the cut recording-paper of a short size is fed.
Figure 5B:
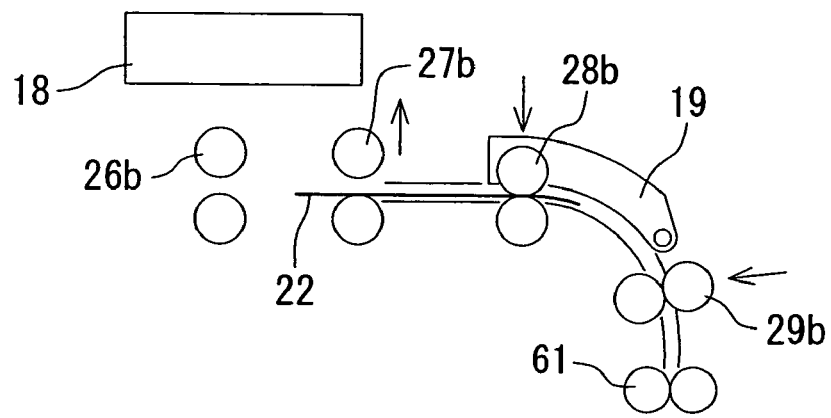
Figure 5C:
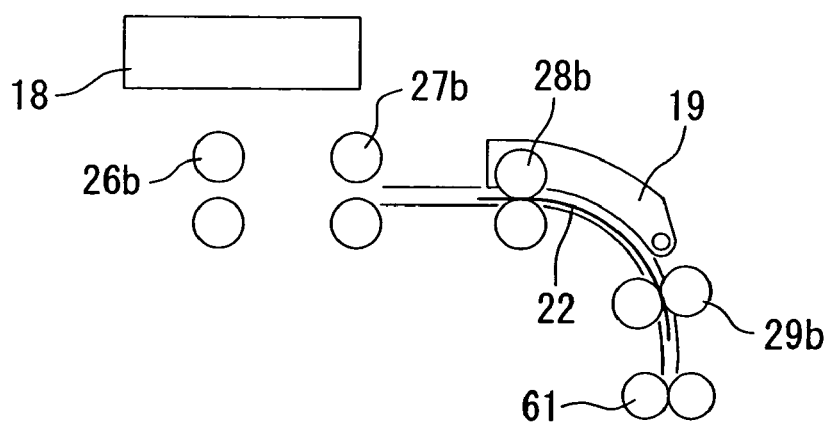

When the cut paper 22 is short and the anterior end of the cut paper 22 does not pass the outer fixed guide 71 during the image exposure, the cut paper 22 is carried in a sequence described below. As shown in FIG. 5, while the cut paper 22 is nipped and carried by the first and second exposure feed-roller pairs 26 and 27, the exposure recording of an image is performed one line by one line. The nip roller 26b is moved to the evacuation position before the posterior end of the cut paper 22 passes the first exposure feed-roller pair 26. In virtue of this, when the cut paper 22 passes the nip roller 26b, a shock to be caused is reduced (see FIG. 5A). After the anterior end of the cut paper 22 has passes the intermediate carrying roller pair 28, the nip rollers 28b and 29b of the intermediate carrying roller pair 28 and the guiding/carrying roller pair 29 are moved from the evacuation position to the nip position. The exposure recording is ultimately performed for the posterior end of the cut paper 22, and the nip roller 27b of the second exposure feed-roller pair 27 is moved to the evacuation position (see FIG. 5B). In this way, the cut paper 22 is forwarded to the roller pairs 28 and 29 (see FIG. 5C). Successively, the cut paper 22 is carried toward the processor section 12.

Figure 6:
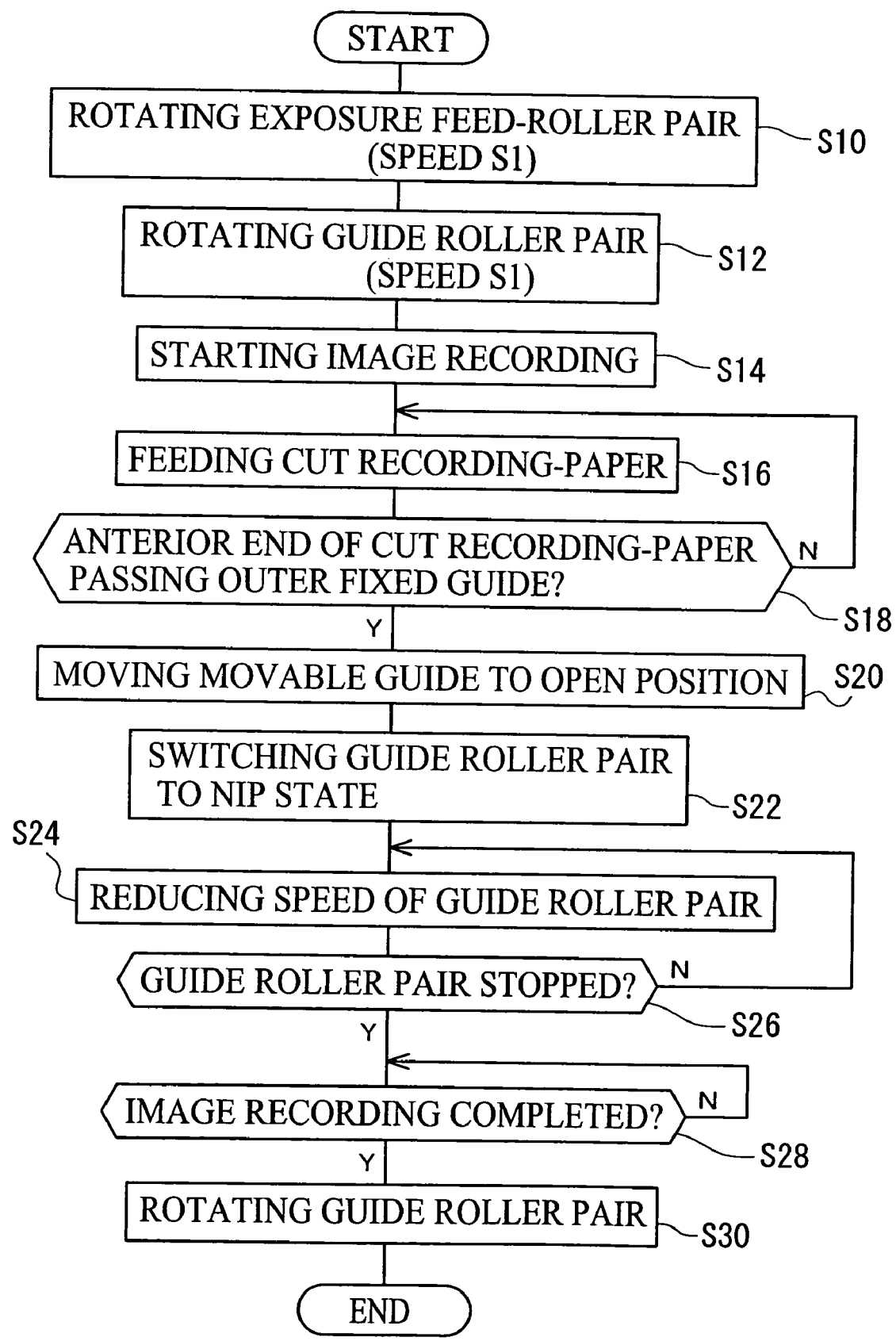
FIG. 6 is a flowchart showing operational sequence in a case that the cut recording-paper of a long size is fed.

In the meantime, when the length of the cut paper 22 in the sub-scanning direction is 160 mm or more, for example, which is longer than a king-size length (152 mm), the anterior end of the cut paper 22 passes the outer fixed guide 71 during the image exposure. In this case, the cut paper 22 is carried according to a flowchart shown in FIG. 6. First, the controller 72 controls the motors 52 and 62 to rotate, at an identical speed S1, the drive rollers 26a and 27a of the first and second exposure feed-roller pairs 26 and 27, and the drive rollers 28a and 29b of the intermediate carrying roller pair 28 and the guiding/carrying roller pair 29 (S10 and S12). In addition, the controller 72 drives the nip controlling motor 68 to move both of the nip rollers 28b and 29b of the intermediate carrying roller pair 28 and the guiding/carrying roller pair 29 to the evacuation position.

Figure 7A:
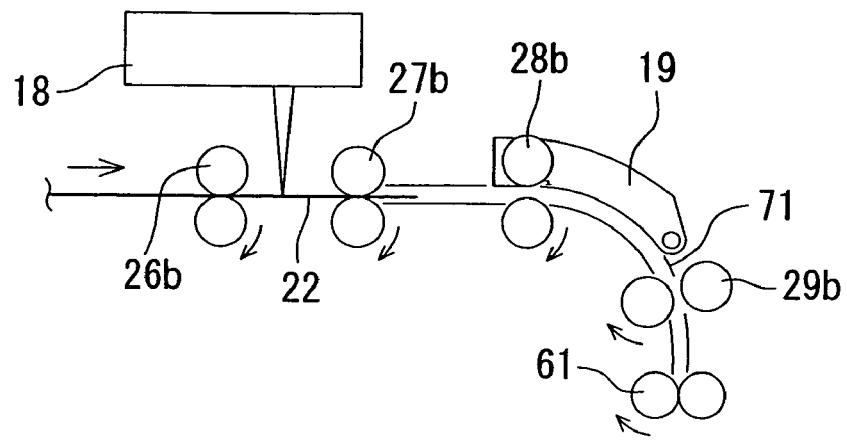
FIGS. 7A, 7B and 7C are explanatory illustrations showing the operation of the feeding mechanism in the case that the cut recording-paper of the long size is fed.
Figure 7B:
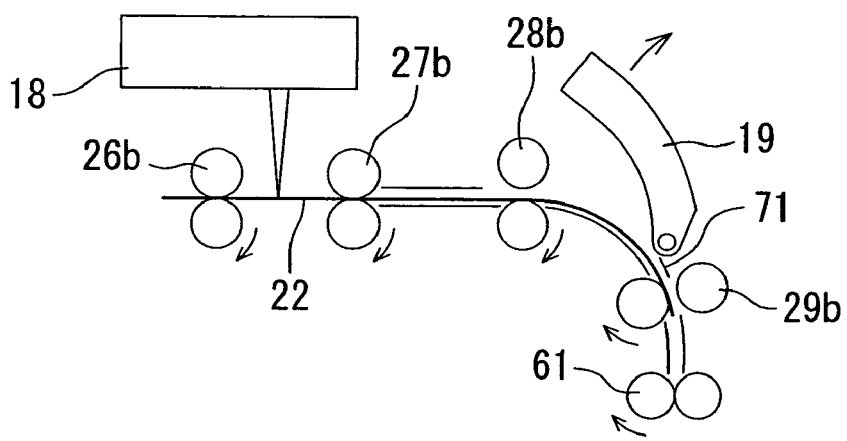

The controller 72 starts the image recording by driving the exposure unit 18 in the state that the first and second exposure feed-roller pairs 26 and 27 nip and feed the cut paper 22 (S14). During the image recording, the cut paper 22 is fed in the sub-scanning direction (S16) and the recording light is radiated from the exposure unit 18 in the scanning direction (FIG. 7A). Since the anterior end of the cut paper 22 is not nipped by the intermediate carrying roller pair 28 during the image recording, a feed speed of the cut paper 22 hardly fluctuates. When it is detected by a sensor, which is not shown, that the anterior end of the cut paper 22 has passed the outer fixed guide 71 (S18), the controller 72 drives the guide releasing motor 70 to move the movable guide 19 to the release position, or the open position (S20), such as shown in FIG. 7B.

Figure 7C:
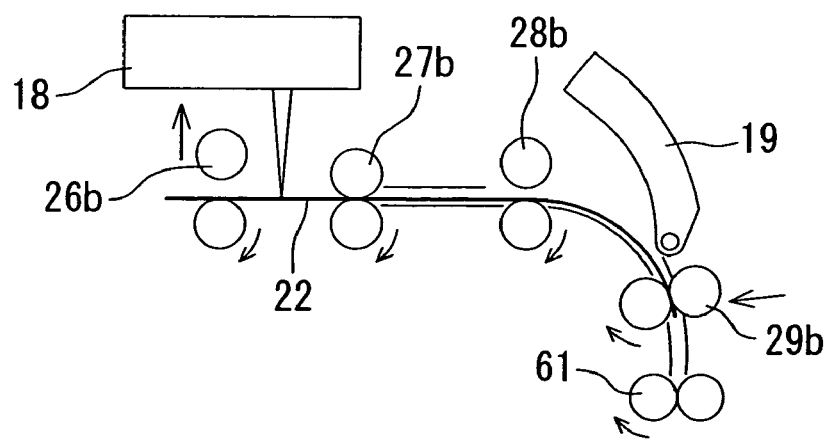

While the movable guide 19 is moved to the open position or after the movable guide 19 has moved to the open position, the anterior end of the cut paper 22 passes the guiding/carrying roller pair 29. At this time, the controller 72 moves the nip roller 29b to the nip position (S22) to nip the cut paper 22 with the guiding/carrying roller pair 29 (FIG. 7C). Since the anterior end of the cut paper 22 does not butt against the guiding/carrying roller pair 29, a shock to be applied to the cut paper 22 is reduced. Further, the nip roller 26b is moved to the evacuation position before the posterior end of the cut paper 22 passes the first exposure feed-roller pair 26. Thus, when the cut paper 22 passes the first exposure feed-roller pair 26, a shock to be caused is reduced.

Figure 8A:
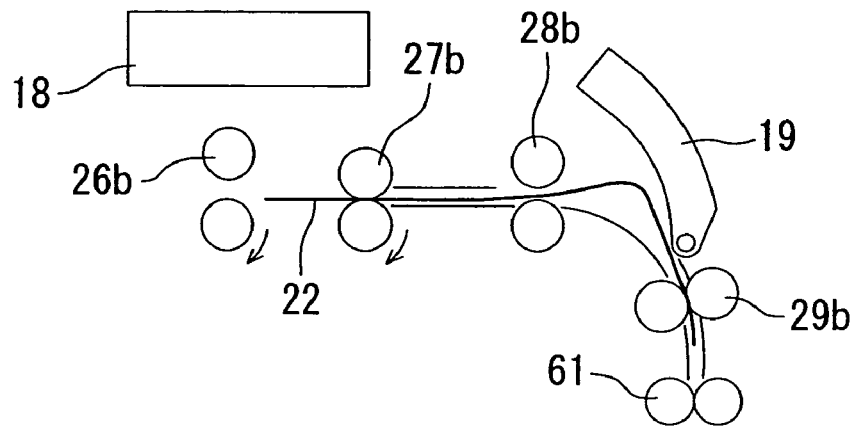
FIGS. 8A, 8B and 8C are explanatory illustrations showing the operation of the feeding mechanism in the case that the cut recording-paper of the long size is fed.

When the nip roller 29b of the guiding/carrying roller pair 29 has reached the nip position, the controller 72 simultaneously drives the motor 62 to gradually reduce the rotational speed of the drive roller 29a of the guiding/carrying roller pair 29 (S24) until the rotation thereof is stopped (S26). Since the anterior end of the cut paper 22 is nipped by the guiding/carrying roller pair 29 of which the carry speed is slow or which temporarily stops the carriage, the cut paper 22 nipped and fed by the second exposure feed-roller pair 27 forms a flexure under the movable guide 19 (FIG. 8A). Owing to this, speed fluctuation of the cut paper 22 is prevented during the exposure feeding so that exposure unevenness is prevented from occurring.

Incidentally, when the flexure of the cut paper 22 is formed, load fluctuation is caused due to stiffness of the cut paper 22. However, the traction drive unit 51 used as a drive transmitter has higher rigidity in comparison with a carrying device of a conventional belt type so that fluctuation of the rotational speed is hardly caused due to the load fluctuation. Thus, even though the flexure of the cut paper 22 is formed, the posterior end of the cut paper 22 is fed at a constant speed and the exposure unevenness is hardly caused.

Figure 8B:
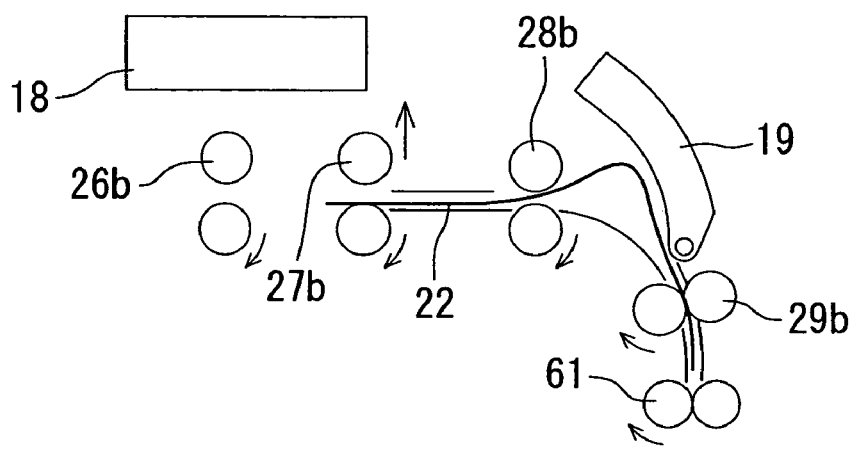
Figure 8C:
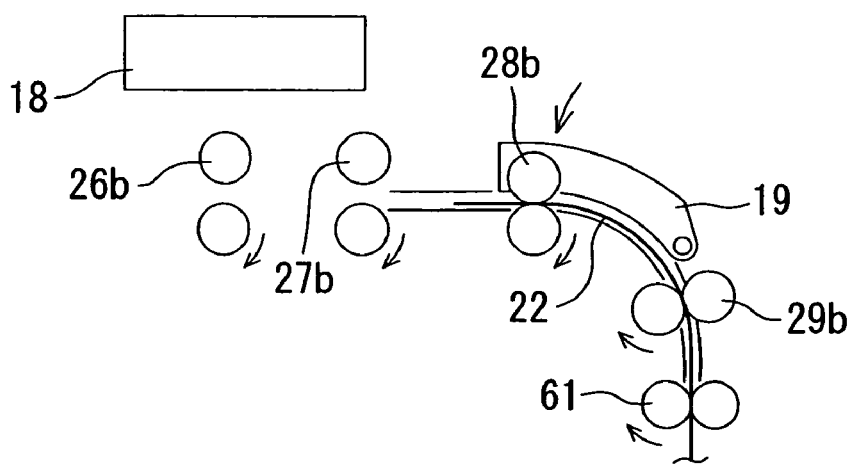

Finally, the exposure recording is performed for the posterior end of the cut paper 22. Upon completion of the image recording (S28), the controller 72 drives the motor 62 to rotate the drive roller 29a of the guiding/carrying roller pair 29 at a speed which is substantially same with the speed S1 of the second exposure feed-roller pair 27 (S30). Moreover, the nip roller 27b of the second exposure feed-roller pair 27 is moved to the evacuation position (FIG. 8B). Further, the controller 72 drives the guide releasing motor 70 to move the movable guide 19 to the guide position (FIG. 8C). In this state, the cut paper 22 is forwarded from the second exposure feed-roller pair 27 to the intermediate carrying roller pair 28 and the guiding/carrying roller pair 29, and then the cut paper 22 is carried toward the processor section 12.

After temporarily stopping the guiding/carrying roller pair 29 and forming the flexure of the cut paper 22, the drive roller 29a of the guiding/carrying roller pair 29 is rotated at the speed which is substantially same with that of the second exposure feed-roller pair 27. In view of this, a speed for carrying the cut paper 22 in the processor section 12 is set so as to be identical with the speed (exposure speed) of the exposure recording so that it is possible to increase the process speed in the processor section 12. The carry speed of the guiding/carrying roller pair 29 may be faster than the exposure speed. In this case, it is possible to make the speed for carrying the cut paper 22 in the processor section 12 faster than the exposure speed. Thus, it is possible to freely design the carry speeds of the processor section 12 and the printer section 11. Incidentally, the carry speed of the guiding/carrying roller pair 29 may be same with that of the processor section 12.

In the above embodiment, the drive roller 29a of the guiding/carrying roller pair 29 is temporarily stopped after speed reduction. However, the rotation of the drive roller 29a may not be stopped on condition that the flexure of the cut paper 22 is formed during the speed reduction and the exposure recording is completed for the posterior end of the cut paper 22.

In the above embodiment, the threshold length of the cut paper 22 for moving the movable guide 19 to the open position is 160 mm in consideration of the king-size length. This threshold length, however, is not limited to this value. For example, the threshold length may be about 260 mm in that a certain margin is added to a panorama-size length (254 mm). The threshold length may be properly determined in consideration of a length of the passage 50 extending from the exposure unit 18 to the guiding/carrying roller pair 29.

Figure 9:
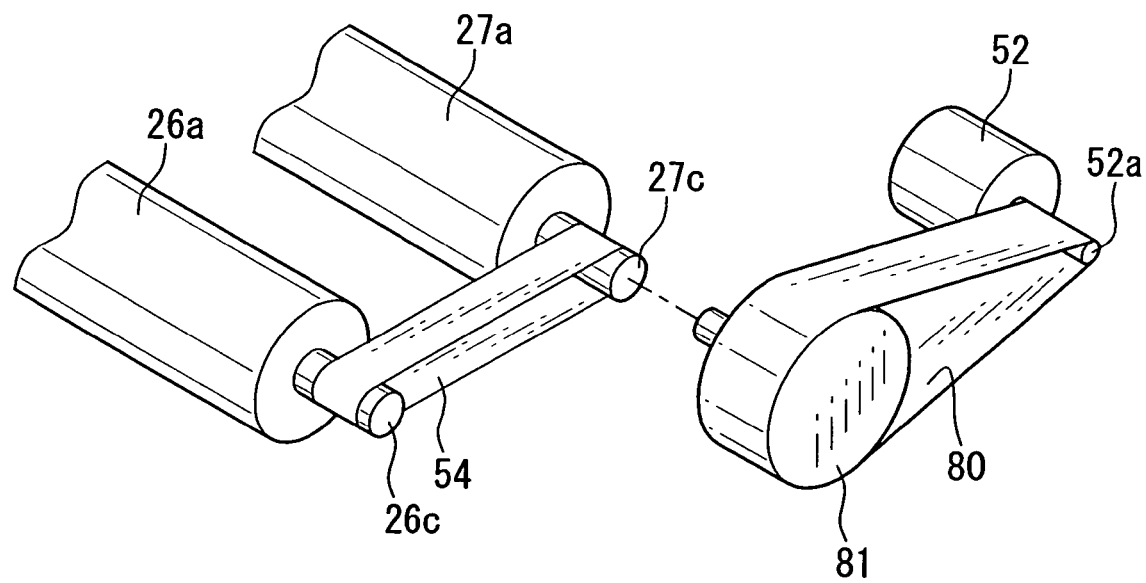
FIG. 9 is a perspective view showing a drive transmitting mechanism using a timing belt.

In the above embodiment, the traction drive unit 51 is used as the drive transmitter for transmitting the drive force to the second exposure feed-roller pair 27. However, as shown in FIG. 9, the drive force may be transmitted from the motor 52 to the drive roller 27a by utilizing a timing belt 80 laid between the output shaft 52a of the motor 52 and a transmission motor 81.

In the forgoing embodiment, the recording surface of the cut paper 22 faces the movable guide 19 of the outer side. However, the recording surface of the cut paper 22 may face the inner curving guide 69. In this case, the exposure unit 18 is disposed at a side of the inner curving guide 69.

The forgoing embodiment is described with the printer processor in which the photosensitive recording paper is exposed to record the image and the recording paper is developed and fixed to form the photo print. The present invention, however, is applicable to any image forming apparatus having an image recording process and a successive post-process thereof. For example, the present invention is applicable to a thermal printer, a thermal-transfer printer, a laser printer and an ink jet printer. Further, the forgoing embodiment is described with the recording paper. However, all kinds of sheet-shaped recording materials can be used on condition that it is possible to record an image and a character.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An image recording apparatus comprising:
    a recorder for recording an image on a cut recording material severed in accordance with a print size;
    a feeder for feeding said cut recording material along a passage such that said cut recording material passes said recorder;
    a carrying roller pair disposed at a downstream side of said feeder to carry said cut recording material, on which the image has been recorded, to a post-processing section, said carrying roller pair being switchable between a nip state for nipping said cut recording material and a release state for releasing a nip of said cut recording material; and
    a regulation member disposed between said feeder and said carrying roller pair so as to be switchable between a first state for regulating a flexure of said cut recording material and a second state for allowing the flexure thereof, said regulation member being switched to said second state when an anterior end of said cut recording material reaches said carrying roller pair during image recording,
    wherein a carry speed of said cut recording material, which depends on a rotational speed of said carrying roller pair, is reduced from a first speed after said carrying roller pair has been changed from said release state to said nip state, and then, the rotational speed of said carrying roller pair is accelerated to carry said cut recording material at a second speed.

2. An image recording apparatus according to claim 1, wherein said carrying roller pair is temporarily stopped before accelerating the rotational speed of said carrying roller pair.

3. An image recording apparatus according to claim 1, wherein said first speed is identical with a feed speed of said feeder.

4. An image recording apparatus according to claim 1, wherein said second speed is substantially same with or more than a feed speed of said feeder.

5. An image recording apparatus according to claim 1, wherein said second speed is identical with a carry speed of said cut recording material carried in said post-processing section.

6. An image recording apparatus according to claim 1, wherein said feeder is connected to a motor via traction drive unit.

7. An image recording apparatus according to claim 1, wherein said feeder is connected to a motor via a timing belt laid between an output shaft of said motor and a transmission motor joined to said feeder.

8. An image recording apparatus according to claim 1, wherein said regulation member is a carrying guide disposed at said passage, said carrying guide conducting said cut recording material in the first state and evacuating from said passage in the second state.

9. An image recording apparatus according to claim 8, wherein said regulation member has an arc for turning a carry direction of said cut recording material and is rotatable around its one end of a downstream side in the carry direction of said cut recording material.

10. An image recording apparatus according to claim 9, further comprising:
    a first motor connected to said one end of said regulation member, which is rotated between said first state and said second state by driving said first motor.

11. An image recording apparatus according to claim 10, further comprising:

a downstream roller pair disposed at a downstream side of said carrying roller pair in said carry direction, said downstream roller pair being connected with said carrying roller pair via a timing belt to carry said cut recording material, which is forwarded from said carrying roller pair, toward said post-processing section.

12. An image recording apparatus according to claim 11, further comprising:
a second motor for driving said downstream roller pair, said rotational speed of said carrying roller pair being controlled via said downstream roller pair by controlling said second motor.

13. An image recording apparatus according to claim 12, further comprising:
a motor driver for driving said first motor and said second motor; and
a controller for controlling said motor driver.

14. An image recording apparatus according to claim 13, wherein said feeder comprises:
a first feed roller pair disposed at an upstream side of said recorder to nip and feed said cut recording material; and
a second feed roller pair disposed at a downstream side of said recorder to nip and feed said cut recording material.

15. An image recording apparatus according to claim 1, wherein the position of a cutter is disposed upstream from said recorder.

16. An image recording method comprising the steps of:
feeding a cut recording material, which is severed in accordance with a print size, with recording feed rollers such that said cut recording material passes a recording section at a first carry speed;
recording an image on said cut recording material while said cut recording material passes said recording section;
changing a regulation member, which is disposed between said recording section and a carrying roller pair, from a first state to a second state after an anterior end of said cut recording material has reached said carrying roller pair during the record of said image, said first state preventing a flexure of said cut recording material from occurring, and said second state allowing occurrence of said flexure;
changing said carrying roller pair from a nip releasing state to a nip state virtually simultaneously at the time of changing said regulation member, the respective rollers of said carrying roller pair separating from each other in said nip releasing state, and the respective rollers approaching in said nip state to nip the anterior end of said cut recording material;
setting a carry speed of said cut recording material, which depends on said carrying roller pair, to a second carry speed at the time of nipping, said second carry speed being equal to or less than said first carry speed, and said carry speed being reduced after nipping the cut recording material;
increasing said carry speed depending on said carrying roller pair up to a third carry speed after completing the record of said cut recording material to carry the recorded cut recording material toward a post-process, said third carry speed being equal to or more than said first carry speed;
returning said regulation member to said first state after the recorded cut recording material has passed, and returning said carrying roller pair to said nip releasing state.

17. An image recording method according to claim 16, wherein rotation of said carrying roller pair is stopped during the step of speed reduction.

* * * * *